United States Patent

[11] 3,598,953

| [72] | Inventor | James R. Campbell<br>1504 Carmelita St., Laguna Beach, Calif. 92651 |
|---|---|---|
| [21] | Appl. No. | 844,718 |
| [22] | Filed | June 30, 1969 |
| [45] | Patented | Aug. 10, 1971 |

[54] METHOD AND APPARATUS FOR BONDING METALLIC PANELS
18 Claims, 6 Drawing Figs.

| [52] | U.S. Cl. | 219/117 |
|---|---|---|
| [51] | Int. Cl. | B23k 11/06 |
| [50] | Field of Search | 219/117, 107, 78 |

[56] References Cited
UNITED STATES PATENTS

| 2,866,075 | 12/1958 | Van Pappelendam | 219/117 UX |
| 2,902,589 | 9/1959 | Wirta | 219/107 |
| 2,910,153 | 10/1959 | Campbell | 219/117 X |

*Primary Examiner* — J. V. Truhe
*Assistant Examiner* — J. G. Smith
*Attorney* — Mahoney, Hornbaker & Schick ABSTRACT: A method of bonding metallic panels wherein the panels consist of upper and lower metallic face sheets having a corresponding metallic core interposed therebetween, said method broadly involving the steps of preparation of the components of the panel by scrupulously cleaning the same and the subsequent steps of electrically bonding said components to each other to an extent sufficient to maintain them in operative relationship with each other but insufficient to enable the panel to sustain the loads and/or environment which it is designed to be subjected to. The subsequent step which places the components of the panel in such structural and operative relationship as to be able to be subjected to design loads and environments involves the heat bonding of the components of the panel to one another by the diffusion-bonding process or by analogous heat-bonding processes including such apparatus as induction-bonding apparatus and the like.

PATENTED AUG 10 1971 3,598,953
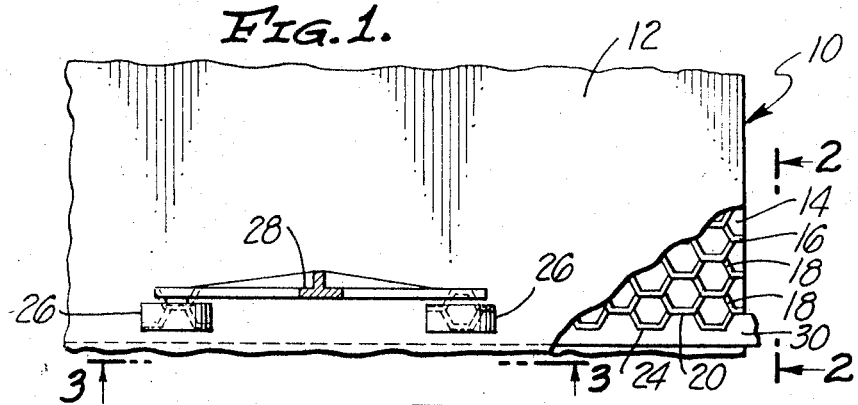
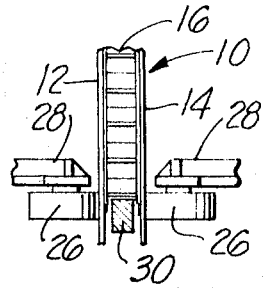
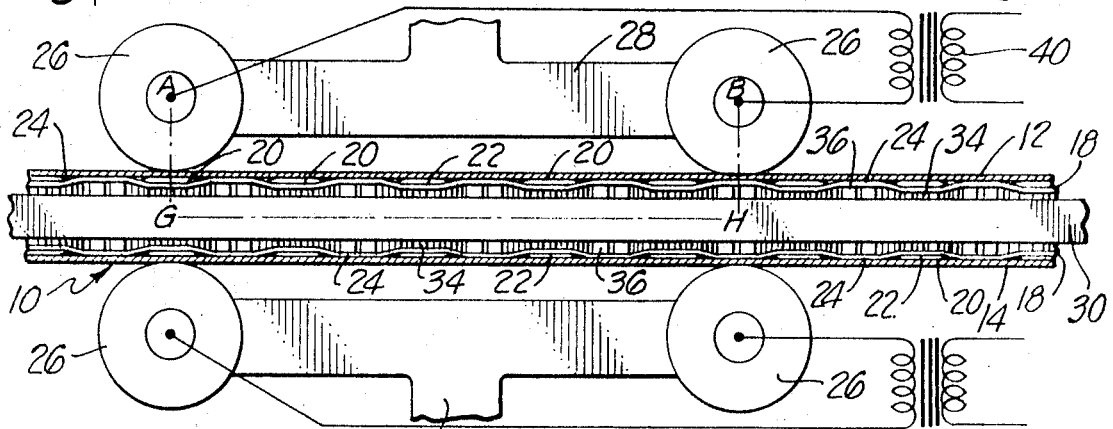
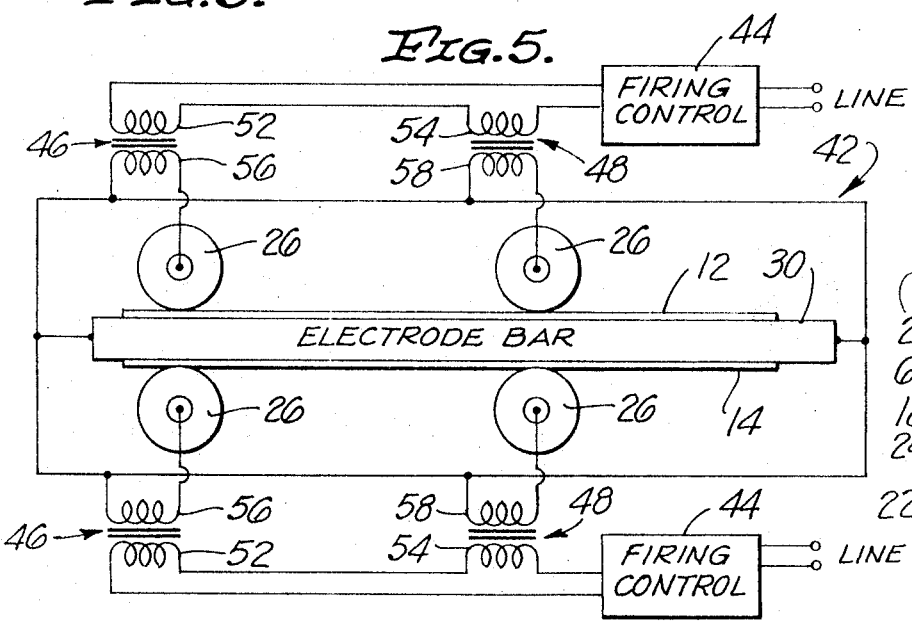
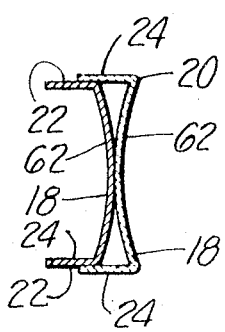
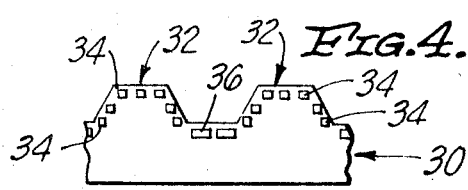
INVENTOR
JAMES R. CAMPBELL
BY
MAHONEY, HORNBAKER
& SCHICK
ATTORNEYS

METHOD AND APPARATUS FOR BONDING METALLIC PANELS

The apparatus of the invention is particularly directed to achieving proper electrical bonding current distribution between the various components of the panel in such a manner as to achieve a suitable temporary bond prior to the subjection of the panel to the heat-bonding step. The apparatus includes electrical bonding means consisting of a pair of longitudinally translatable electrodes cooperative with an electrode bar. The longitudinally translatable electrodes are mounted for movement in engagement with the exterior surface of one of the face sheets of the panel, and the elongated electrode bar is inserted into the interior of the panel in supportive relationship with a core element being bonded into the core structure of the panel and to the inner surface of the respective face sheet.

The longitudinally translatable pair of electrodes are so spaced as to cause them to deliver electrical bonding current to spaced portions of the panel and core structure having different electrical characteristics. Furthermore, the longitudinally translatable pair of electrodes are connected in a circuit with the elongated electrode in such a manner that maximum current equalization at both of the electrodes is achieved with minimum current bypassing through the surface sheet. In addition, the elongated electrode bar is provided with means adapted to cooperate with longitudinally translatable electrodes to subject different portions of the panel and core structure to different current densities to accommodate for different thicknesses of the face sheet and core structure being bonded to one another.

BACKGROUND OF THE INVENTION

Recent advances in aeronautical and aerospace technology have caused a demand for structural materials which would meet the stringent requirements of supersonic exposure, elevated temperatures and the various other physical phenomena incidental to supersonic speeds such as high-energy sound levels. Among the materials which have been offered to cope with the problems generated in the aeronautical and astronautical fields have been various types of composite panels usually consisting of a core structure supporting first and second face sheets in spaced relationship with each other.

Initially, the face sheets were fabricated from aluminum and the core structure fabricated from such relatively perishable materials as resin-impregnated paper secured to the interior surfaces of the aluminum face sheets by various types of natural or synthetic adhesives. The requirements of the advancing technologies led ultimately to the utilization of aluminum core structures secured to aluminum face sheets by the same resinous adhesives as previously utilized with the fibrous cores. In time, a brazing process involving the utilization of brazing materials as a means of attaching the aluminum face sheets to the aluminum core structures was developed.

Subsequently, stainless steel face sheets and core structures were substituted for the aluminum face sheets and core structures. Ultimately, an all-welded stainless steel honeycomb core panel was developed, as disclosed in my U.S. Pat. No. 2,910,153, issued Oct. 27, 1959, entitled "Structural Panel of Honeycomb Type." Apparatus and methods were also developed to accomplish the automatic welding of the stainless steel core structures to the face sheets utilized in conjunction therewith, as exemplified by my previously issued U.S. Pats. Nos. 2,931,883, issued Mar. 29, 1960 entitled "Method and Apparatus for Fabricating Structural Panel and Core Therefor," and 3,015,715, issued Jan. 2, 1962 entitled "Method and Apparatus for Resistance Welding."

Because of the fact that the stainless steel sheet materials utilized in the fabrication of the panels in accordance with my invention were substantially foillike in nature, that is, having a thickness in the range extending between two-thousandths and five-thousandths of an inch, considerable difficulty was encountered in developing the apparatus and methods disclosed in my previously mentioned patents. However, with the advent of the product and the apparatus, numerous applications of the stainless-steel-welded honeycomb core panel were made in critical areas of aircraft and aircraft engines and in space technology. However, recent requirements in astronautics and aeronautics have dictated the use of even more sophisticated constructions where weight, fatigue resistance and temperature factors are encountered that require the utilization of titanium or stainless steel panel of even greater structural integrity.

Considerable developmental and research work has been engaged in to fabricate welded panels characterized by the incorporation of titanium foil cores having titanium face sheets affixed thereto by the welding processes of the above referenced applications, and such panels have exhibited physical characteristics superior in some aspects to those of the previously mentioned stainless steel panels. However, in supersonic applications or in applications where elevated temperatures, stringent and large fatigue requirement loads are imposed upon the panels, the conventional weldments connecting the face sheets to the core structures of the panels tend to create stress risers which constitute areas of load concentration susceptible to incipient failure resulting in possible destruction of the panel by causing delamination of the face sheets from operative relationship with the associated core structure, and also possible fatigue of the face sheets.

Consequently, I have developed a method and apparatus for creating a metallic panel structure of the general character of the metallic panels previously utilized, but substantially devoid of the stress riser characteristics encountered when conventional welding techniques are utilized. Although the method and apparatus will be described hereinbelow as applied specifically to the fabrication of panels incorporating titanium cores having titanium face sheets affixed thereto, it will, of course, be obvious to those skilled in the art that the teachings and practices of the invention may be applied with equal cogency to materials other than titanium, and it is not intended that said teachings and practices be limited to the specific materials disclosed.

OBJECTS AND SUMMARY OF THE INVENTION

The teachings of my invention embrace two general areas, that is, a method of fabricating metallic panels and apparatus for performing one of the critical steps of the method. As a result of the practice of the steps of the method and the utilization of the apparatus disclosed hereinbelow, large metallic panels fabricated from titanium and substantially devoid of the stress risers incident to the utilization of the conventional welding process have been fabricated and have been tested with very satisfactory results. The titanium panels are particularly desirable in various aircraft structures where exposure to significant loads at moderately elevated temperatures is encountered, such as in the external wing surfaces of supersonic aircraft. The substantial absence of stress risers eliminates the possibility of incipient failure of the panels resulting from tension fatigue of the face sheets or the delamination of the face sheets from operative relationship with the associated core and, further, the intimacy of the bond between the face sheets and core resulting from the practice of the method and in the utilization of the apparatus of my invention is due to molecular diffusion between the adjacent surfaces of the core structure and the face sheets of the panel.

It is, therefore, an object of my invention to provide a method of fabricating a composite metallic panel which is characterized, primarily, by the practice of two major steps, that is, an initial electric-bonding step and a subsequent heat-bonding step.

The electrical bonding step can be accomplished, as will be adverted to in greater detail hereinbelow, by the application of carefully controlled electrical bonding current and pressure to cause initial bonding between the interior surfaces of the face sheets and the contiguous areas of the core structure to occur.

The consequent bond resulting from the electrical bonding step is characterized by the face that it is sufficient to maintain the components of the panel in operative relationship with one another, but is essentially insufficient to resist design loads and environments to which the panel may be ultimately subjected.

After the core and face sheets of the panel have been electrically bonded to one another, the panel is subjected to a heat-bonding step which structurally integrates the components of the panel to such an extent as to prevent the delamination of the face sheets of the panel from operative relationship with the core structure absent the mechanical disruption and damage of the core structure and face sheets. The heat-bonding step may be practiced by the utilization of well-known diffusion-bonding techniques or may be accomplished by exposure of the electrically bonded panel to inductive current in a reducing atmosphere.

Attempts have been made in the past to fabricate metallic panels including metallic core structures and face sheets by diffusion-bonding processes alone, but such attempts have been characterized by the inability to produce commercial quantities of panel because of the difficulties encountered in obtaining the requisite intimacy of contact between the contiguous surfaces of the core structure and face sheets. That is, the pressures required to achieve such contiguous intimacy have resulted in the ultimate collapse or distortion of areas of the panel being diffusion bonded if the panel was of commercial size. However, by the practice of the sequential steps of preliminary electrical bonding and subsequent diffusion bonding, the elimination of the need for external pressure during the diffusion-bonding step has resulted in the achievement of panels characterized by coplanarity of the surfaces of the face sheets and the undiminished structural integrity of the face sheets and core structure interposed therebetween.

A further object of my invention is the provision of a method of the aforementioned character wherein the electrical bonding step takes place during the application of high pressure to the exterior surface or surfaces of the face sheets while the core structure disposed intermediate the face sheets is supported to resist the collapse of the core structure during the application of the high pressures to said exterior surfaces of said face sheets. In addition, the relatively low bonding current utilized eliminates the oxidation encountered when welding current densities are utilized and the consequent contamination of the areas immediately adjacent the bond.

Of course, oxidation of the metal adjacent the bond is inimical to the successful heat bonding of the components of the panel by the diffusion process since the contamination of the panel in the oxidized areas prevents the proper molecular interchange and diffusion between the contiguous surfaces of the panel components and also negates the salutary effect of the previous cleansing step to which the components have been subjected.

Another object of my invention is the provision of an apparatus for use in electrically bonding the components of a sheet metal panel in operative relationship with one another which includes electrical bonding means constituted by spaced, longitudinally translatable electrodes adapted to be imposed upon the exterior surface of a respective face sheet and an associated elongated electrode bar adapted to be disposed in supportive relationship with an underlying core structure adjacent said face sheet, said electrode bar having means thereupon for causing contiguous areas of said face sheet and core structure to be exposed to different bonding current densities where such contiguous areas are of different physical thicknesses.

Another object of my invention is the provision of an apparatus of the aforementioned character wherein the spaced electrodes are connected in such a manner as to prevent the bypassing of bonding current through the face sheets to maintain a maximum current density balance between said spaced electrodes.

A further object of my invention is the provision of an apparatus of the aforementioned character wherein the spacing between said longitudinally translatable electrodes is such that one electrode is superimposed upon an area of said panel characterized by greater thickness while the other of said electrodes is disposed in overlying relationship with an area of said panel characterized by lesser thickness than the other area.

Other objects and advantages of my invention will be apparent from the following specification and the accompanying drawing which is for the purpose of illustration only and in which:

BRIEF DESCRIPTION OF THE DRAWING

FIG. 1 is a fragmentary top plan view showing a pair of longitudinally translatable electrodes of the apparatus of the invention engaged in performing the electrical bonding step of the method of the invention;

FIG. 2 is a fragmentary, vertical sectional view taken from the broken line 2–2 of FIG. 1;

FIG. 3 is an enlarged fragmentary view taken from the broken line 3–3 of FIG. 1;

FIG. 4 is an enlarged, fragmentary side elevational view of a portion of the electrode bar utilized in the electrical bonding apparatus of the invention;

FIG. 5 is a schematic circuit diagram showing the balancing circuitry utilized in conjunction with the electrical bonding means of the invention; and FIG. 6 is an enlarged, vertical fragmentary sectional view showing the manner in which the nodal areas of the core structure of a panel to be subjected to the method steps of my invention are juxtaposed to each other during the electrical bonding step.

DESCRIPTION OF EMBODIMENTS OF THE METHOD AND

APPARATUS OF THE INVENTION

Referring to the drawing and particularly to FIGS. 1—3 thereof, I show a metallic panel 10 adapted to be fabricated by the method and apparatus of the invention. The panel 10 includes upper and lower face sheets 12 and 14 and a honeycomb core structure 16, said honeycomb core structure being constituted by a plurality of core strips 18 which are of generally corrugated configuration, as best shown in FIG. 1 of the drawing, and which have internested nodal areas or nodes 20 with the nodes 20 of the core strips 18 which project upwardly being depressed, as at 22, FIG. 3, to provide for the facile interfitting of the upwardly projecting nodes 20 of a core strip 18 within the downwardly projecting nodes 20 of a previously located core strip, as best shown in FIGS. 1 and 3 of the drawing, and as more particularly described in my previously referred to U.S. Pat. No. 2,910,153.

Although the method of my invention is described as being applied in the present application to the specific panel disclosed herein and shown in the various Figures of the drawing, it, of course, will be obvious to those skilled in the art that various types of composite metal panels having metallic cores and metallic face sheets may be fabricated by the steps of the process and the use of the apparatus of my invention without departing materially in any respect from the teachings thereof.

For instance, the core strips 18 of the core 16 of the panel 10 incorporate laterally directed flanges 24 which are disposed in coplanarity with the inner surfaces of the face sheets 12 and 14 and which provide linear areas of substantial width sufficient to permit the performance of the electrical bonding and the heat-bonding steps. This structure is sharp contrast with conventional stainless-steel-brazed panel structures wherein the stainless steel core is characterized by the fact that the opposite sides of the core have no flanges thereupon and constitute, in effect, sharp edges which prevent the application of the electrical bonding and heat-bonding steps because there is insufficient area to permit the operation of the steps and the consequent structural affixation of the core to the inner surfaces of the face sheets.

As previously mentioned, the metallic components of the panel 10 are fabricated from titanium in dimensions which are characteristic of metallic foils. For instance, titanium foils of 0.003 inches in thickness have been utilized in the core and foils of 0.040 inches in thickness have been used in the face sheets. For instance, I have found that when the panel 10 is fabricated from heat-treatable alpha-beta alloys, the combination of 6Al–4V alloy face sheets and 3Al–2.5V core strips provides a panel 10 having very high mechanical properties suitable for application in demanding aeronautical and astronautical environments.

However, while the method and apparatus of the invention is described as applied in conjunction with titanium alloy foils, it is not intended to limit the teachings of the invention to any particular material, since other suitable materials, including stainless steel, are available to which said teachings may be applied.

As previously indicated, one of the basic requirements for the achievement of structural integrity of the panel 10 is a high degree of cleanliness of the components, that is, the face sheets 12 and 14 and the flanged core strips 18, prior to the practice of the electrical bonding step. To achieve such cleanliness of the components, pickling or other cleansing steps are essential. In addition, the time between the pickling operation and the fabrication of the panel 10 should be reduced to the minimum. In practice I have found that a maximum exposure of the treated components to atmosphere is 24 hours. If manufacturing procedures indicate a greater exposure, the component parts should be stored in a nonoxidizing environment until they are to be utilized.

Other cleanliness controls entail the utilization of coolants which have been suitably treated to eliminate the maximum of contaminants therefrom so that detritus from said coolants will not be deposited upon the surface of the components of the panel 10 during the electrical bonding step which entails the utilization of various liquid coolants such as water. As a matter of fact, the utilization of deionized water for flood cooling during the electrical bonding process is desirable. In addition, the apparatus for accomplishing the electrical bonding step should be located in dust-free environments to eliminate the possibility of contamination of the panel 10 during the electrical bonding step.

Furthermore, care must be taken that burrs and chips on the components resulting from cutting operations thereupon be eliminated from said components, and that contamination by the electrical bonding apparatus itself (lubricants, dust or metal particles) be obviated to the greatest extent possible.

After the proper cleansing precautions have been taken, the component face sheets 12 and 14 and core strips 18 are deposited, in a manner to be described in greater detail below, in the apparatus of the invention. Since the general structural relationship of the components of the apparatus is disclosed in my previously mentioned U.S. Pat. No. 3,077,532, issued Feb. 12, 1963, entitled, "Method and Apparatus for Fabricating Honeycomb Core," a detailed description thereof is not deemed necessary since the apparatus of the present invention is limited primarily to the control of the electrical bonding current in the performance of the electrical bonding step.

In preparation for the electrical bonding step, the first and second face sheets 12 and 14 may be oriented in either a vertical or horizontal position in spaced relationship with each other, as best shown in FIG. 3 of the drawing. The spacing of the face sheets 12 and 14 is determined by the height of the core strips 18 to be inserted into the space between said face sheets.

The electrical bonding apparatus includes electrical bonding means constituted by a pair of longitudinally translatable electrical bonding rollers 26, said electrical bonding rollers being translatable in a longitudinal path and being maintained in a predetermined spatial and operative relationship with each other by means of a yoke 28.

Operatively associated with the electrical bonding means is an elongated electrode 30 which is adapted to be inserted in the space between the face sheets 12 and 14 carrying a single core strip 18 for operative engagement with the previously inserted core strips, said elongated electrode bar 30 incorporating a plurality of bonding projections 32, as best shown in FIGS. 3 and 4 of the drawing, the bonding projections 34 engageable with the nodal areas of the core strips 18 being smaller and of greater number than the larger and fewer projections 36 adapted to engage the portions of the core strips 18 intermediate the nodal areas.

Consequently, the bonding current density is greater where three layers of titanium material are encountered at the overlapped, internested nodal areas 20 and reduced current densities are experienced where the intermediate portions of the flanges 24 constitute two layers of material with the adjacent face sheets 12 and 14.

For instance, the relatively small bonding projections 34 can be provided in a dimension of approximately 0.025×0.025 inches and the larger projections 36 may have a dimension of approximately 0.060×0.045 inches. Of course, the dimensions of the bonding projections can be altered to meet different bonding requirements but the basic principle of providing more numerous and smaller projections at the thicker areas of the panel always applies.

In addition to the control of the current densities achieved by the differential sizing of the bonding projections 34 and 36, the elongated electrode 30 also serves as a supporting means for the core structure and the relevant core strips 18 during the electrical bonding process. This physical support by the electrode during the electrical bonding process is important since the bonding rollers 26 are subjected to pressures of an order of 20,000 to 40,000 p.s.i. to ensure the intimate contact between the adjacent surfaces of the flanges 24 of the core strips 18 and the interior contiguous surfaces of the face sheets 12 and 14. Of course, the flanges 24 provide linear areas of substantial cross section to facilitate the performance of the electrical bonding step, said flanges being disposed in horizontal planes and substantial parallelism with the inner surfaces of the face sheets 12 and 14. The importance of the control of pressure on the face sheets 12 and 14 and associated core 18 is attributable to the fact that relatively low electrical bonding current is utilized to avoid the creation of spot-welding phenomena which would be deleterious during the heat-bonding step.

Undesirable welding phenomena to be avoided during electrical bonding include excessive thermally induced stresses resulting from the creation of spot welds and thermally and mechanically induced deformations in the face sheets. Such deformations are generally constituted by a displacement of metal occurring during the plastic or molten stage of the weld pulse, and result in stress risers which can nullify desired designed criteria if created in the panel. Furthermore, as previously pointed out, one of the criteria of the success of the heat-bonding process is maximum cleanliness and oxidation or dissociation phenomena characteristic of spot welding would result in undesirable contamination at the critical interface between the horizontally oriented flanges 24 of the core 16 and the inner surfaces of the face sheets 12 and 14.

Consequently, the achievement of consistent and precise bonding current control sufficient to bond the adjacent surfaces of the core structure 16 to the inner surfaces of the face sheets 12 and 14 and the relevant adjacent internested and overlapped faces of the core strips 18 to one another, but insufficient to oxidize or contaminate the faces, is a basic prerequisite for the ultimate success of the heat-bonding step.

During the electrical bonding step, after the elongated electrode 30 has been inserted into the space between the face sheets 12 and 14, carrying a core strip 18, and has located said core strip 18 with the respective flanges 24 at the nodal areas 20 and overlapped and in internested relationship, the pairs of bonding rollers 26 are translated longitudinally across the respective surfaces of the face sheets 12 and 14 in a linear path coincident with the linear, horizontally oriented surfaces provided by the flanges 24 of the underlying internested core strips 18. Because of the fact that two bonding rollers 26 are utilized in each of the electrical bonding means, and because there is a difference in the thickness of the materials to be bonded due to the fact that the combination of the face sheets and internested nodal areas provides three layers of materials while only two layers of materials are provided between the internested areas, it is desirable to have a current density increase available for the bonding roller 26 engaged with the interengaged overlapping flange area underlying the respective face sheet.

To accomplish this desired result, the bonding rollers 26 are so spaced that, as best shown in FIG. 3 of the drawing, a bonding roller 26 of each pair will overlie a triple-layer portion of the panel 10 being bonded while the other roller will overlie a double-layer portion of the panel being bonded.

Consequently, the current flow always occurs through the double layer of material at the same time that it occurs through the triple layer and, thus, the relatively high resistance path A to G is always subjected to the same current flow as the relatively low resistance path B to H through the elongated electrode bar 30. This automatic adjustment of the bonding current density ensures that the increased current density will be achieved at the triple-layer areas as distinguished from the double-layer areas having smaller current density requirements and also ensures that a proper electrical bond will be achieved at these areas without incurring the danger of subjecting the panel to a welding action which would result in the undesirable oxidation phenomena referred to in detail hereinabove.

It will be noted that the showing of the spacing of the bonding rollers 26 in FIG. 3 of the drawing illustrates the use of a conventional transformer hookup wherein a single transformer 40 is utilized with each pair of welding rollers 26. However, I have discovered that more effective bonding current control may be achieved by improved circuitry connected to the bonding rollers 26, as best illustrated schematically in FIG. 3 of the drawing. With the improved circuit 42, the firing control 44 is connected to a pair of welding transformers 46 and 48 whose primaries 52 and 54, respectively, are connected in series and whose secondaries 56 and 58 are respectively connected to an associated welding roller and the electrode bar 30.

As the result of the utilization of the circuit 42, current flow in the secondaries 56 and 58 tends to be substantially identical. For instance, if one secondary is closed and the other secondary is open, very little current will flow in the one secondary. Within limits, the circuit is a constant current circuit when fired with a constant voltage supply.

One of the significant advantages of the use of the circuit 42 is that substantially the same potential would be impressed on the assembled components of the panel 10 at each bonding roller so that no bypassed current down the face sheets 12 and 14 would be encountered as such bypassed current is encountered with the circuitry as shown in FIG. 3 of the drawing. The circuit 42 will thus provide balanced power on both rollers 26, permit widely divergent control settings for different thickness of face sheets, and compensate for or eliminate variable IR drop effects due to electrode bar resistance variation with roller travel. The circuitry shown in FIG. 3 involves no variable IR drop effects. A single-bonding roller connected to a welding transformer secondary leg, the other leg of which is connected to the bar, will work so as to control current density if the firing control is so programmed. However, it has the disadvantage of requiring twice the weld time and consequent cost increase, and it would also be necessary to program the firing control for variable IR drop in the bar.

By utilizing the apparatus described hereinabove or one or more aspects of the apparatus, it is possible to achieve an electrically bonded panel which will meet the criteria previously adverted to for the heat-bonding step.

The nodal areas 20 of the individual core strips 18 are, of course, provided with and incorporate adjacent vertical areas 62 which are juxtaposed to each other, as best shown schematically in FIG. 6 of the drawing, during the process of insertion of the nodal areas of one core strip into internested relationship with a previously inserted core strip 18. In the welded configurations of panel of the same basic structure as the panel 10, it has previously been found necessary to weld the vertical areas 62 of the nodal portions 20 of the core strips 18 in operative relationship with one another. However, it has been ascertained that, due to the forming process of the core strips 18, the vertical areas 62 incorporate bulges or bows which cause portions of the vertical areas 62 to automatically engage each other, and it has also been found that it is not necessary to bond these vertical areas 62 to each other during the electrical bonding step, although, of course, such electrical bonding of the vertical areas 62 of the nodal areas or portions 20 of the core strips 18 can be accomplished. Even though unbonded, I have ascertained that the intimate contact of the vertical areas 62 of the nodal portions 20 of the core strips 18 causes them to be bonded to each other during the heat-bonding step of the method of my invention.

Of course, one of the major problems encountered in the proper bonding of the components of the panel 10 in operative relationship prior to the heat-bonding step is the control of the bonding temperatures which, of course, are contingent upon such other factors as the thickness of the face sheets; the pressure of the bonding rollers; the roller speed; the configuration, thickness and material of the core; electrical current pulse characteristics; roller material and configuration; the force with which the core strips are internested with each other and the line voltage.

In the overall apparatus, as disclosed in the above referenced patents, the criterion of the heat produced by the bonding current is a combination of the transformer tap and the phase shift including power factor correction and cool time as determined by the adjustment of heat or temperature control knobs.

On many occasions attempts have been made to empirically determine the temperature created at the interface between adjacent faying surfaces during spot welding of various sheet metals to each other but these attempts have failed because the insertion of any temperature detecting means between the elements to be welded does not provide an indication as to where the specific reading took place. Consequently, I have relied upon empirical experimentation to determine the setting for the specific materials utilized in the panel 10, in the present instance, the titanium alloy mentioned hereinabove.

For instance, at the beginning or the end of an experimental panel I have allowed for 12 extra core strips and have tabulated the core strips in order to keep a record thereof. I have then reduced the current setting from a predetermined norm by increasing the phase shift a predetermined amount approximately equal to 0.2 volts peak at the rollers. I have then inserted two more core strips and again reduced heat by the same means and in the same percentages as set forth hereinabove. The process has been repeated until all six pairs of core strips have been subjected to the heat reduction.

The quality of the bond for each zone of two core strips subjected to progressively reduced temperatures has then been inspected to establish the minimum bonding current.

In addition, there are certain visual criteria which can be utilized to inspect the bond in order to determine whether a satisfactory bond will occur during the heat-bonding step. One of the primary criteria utilized is to inspect the bond to determine that there is an absence of spot-welding phenomena such as discoloration of the material, thermo or structural deformation of the material at the bonding area or notable indication of oxidization of the material at the contiguous surfaces of the face sheets and the core. If such indications are present the bonding process has failed because of the fact that the oxidized areas as indicated by deformation, discoloration, or other welding phenomena will result in oxygen contamination during the heat-bonding process and prevent the creation of a satisfactory molecular interchange between the surfaces of the face sheets and the core.

A positive visual indication of a satisfactory electrical bond is a slightly frosty appearance at the interfaces between the face sheets and the opposite sides of the core secured to said face sheets with notable absence of yellow or bluish discolorations adjacent the bonded zones.

The panel 10 is completed by the repeated insertion of core strips 18 into operative relationship with one another until the size of panel desired has been attained by the use of the electrical bonding step in securing the core strips 18 into a core structure 16 and in securing the resulting core structure 16 to the inner surface of face sheets 12 and 14. The panel 10 is then ready to be subjected to the heat-bonding step, which in the present practice of the invention, is accomplished by heating in a vacuum.

To accomplish the heat or diffusion bonding of the panel, I have utilized an automatic vacuum furnace which will accept a large-sized panel or panels. Titanium getter shields of C.P. titanium may be placed about the panels in the furnace to protect the panel from excessive heat radiation and gas contamination. The heating rates are controlled by automatic control equipment and the vacuum is maintained at $10^{14}$ TORR or greater, if possible. The temperature to which the panel 10 is exposed may be in the range of 1,600° Fahrenheit for approximately 2 hours to cause the molecular diffusion of the metal at the interfaces between the core 16 and the face sheets 12 and 14. Time and temperature can be varied independently or reciprocally over a wide range to satisfy specific requirements. Certain stainless steels would be advantageously diffusion bonded at 2,300° F. The utilization of dry hydrogen atmosphere facilitates the diffusion bonding of stainless steel. In any event, a general rule of thumb for establishing the heat bond temperature is that it should be above the solution annealing temperature and below the temperature at which grain growth is excessive.

Because of the fact that the interfaces of the core and face sheets are maintained in intimate juxtaposition with each other due to the previous electrical bonding step, and because there is a substantially complete absence of contaminants at said interfaces by either vagrant or induced contaminants, the maximum diffusion at the said interfaces occurs. As a matter of fact, the success of the diffusion bonding of the interfaces is a criterion of the success of the electrical bonding step since any contamination, whether vagrant or induced, in the electrical bonding step will result in an impaired diffusion bond between the interfaces of the components of the panel.

The panels may be suspended in the diffusion-bonding oven or may be placed upon flat platens if it is so desired. In addition, it has been found that the panels will assume the configuration of contoured dies upon which they are placed during the heat-bonding process as carried out in the diffusion-bonding oven.

During the diffusion-bonding process the rate of heating is carefully controlled while maintaining the $10^{14}$ TORR vacuum. Since major outgassing may be encountered between 1,000° F. and 1,300° F., the heating rate until this range is reached can be as low as 10° F./minute. When the 1,300° F. temperature is reached, it may be temporarily arrested to stabilize the vacuum.

The heating rate from 1,300° F. to the diffusion-bonding temperature may be as low as 5° F./minute. The relatively slow heating rates minimize contamination due to possible heavy outgassing.

Under certain conditions, it may be desirable to heat rapidly to a temperature where grain growth would tend to start, then drop back to a temperature slightly above the solution anneal temperature for the heat-bonding soak. With titanium 6Al-4 V, this could involve rapid heating to 1,725° F., then a reduction to 1,500° F., immediately upon reaching 1,725° F., for the heat bond soak time of perhaps one or more hours.

I claim:

1. In a method of bonding a panel consisting of a honeycomb core constituted by a plurality of core strips having laterally directed electrically conductive flanges on their opposite edges, said core strips being corrugated to provide successive nodal areas which are depressed at their opposite extremities to facilitate the interengagement therewith of mating nodal areas of adjacent core strips, said panel including a first electrically conductive face sheet and a second electrically conductive face sheet, the steps of: disposing said first and second face sheets in spaced relationship with each other; successively inserting a plurality of core strips in said space; locating said core strips in said space with mating nodal areas under pressure and in intimate contact and with said flanges in intimate engagement with the inner surfaces of said first and second face sheets; successively electrically bonding the opposite flanges of said core strips to the inner surfaces of said first and second face sheets; and subjecting the panel, when the electrical bonding of said core strips and face sheets has been completed, to a heat-bonding step to cause the intimate bonding of said flanges to said face sheets and said nodal areas to one another.

2. The method of claim 1 in which said electrical bonding step includes the electrical bonding of said nodal areas to each other intermediate the opposite extremities thereof.

3. The method of claim 1 in which the electrical bonding step involves the use of an electrode bar to support the individual core strips between the first and second face sheets during the electrical bonding process and to conduct bonding current, said electrode bar being provided with a plurality of projections thereupon, said projections being smaller in the mating nodal areas to achieve greater current density in said areas than is applied to said flanges of said core strips intermediate said mating nodal areas.

4. The method of claim 3 in which said electrical bonding step involves the application of bonding current to at least the external surface of one of said surface sheets in a line with said electrode bar and wherein said current is applied simultaneously to spaced areas of said sheet overlying, respectively, the mating nodal areas of two adjacent core strips and an area of one of said core strips intermediate mating nodal areas thereof.

5. The method of claim 1 in which the heat-bonding step is performed in a reducing environment.

6. In a method of bonding the electrically conductive face sheets of a composite panel to the electrically conductive core thereof where said core incorporates oppositely oriented portions having surfaces thereupon of sufficient width to engage significant areas of the inner surfaces of said face sheets, the steps of: disposing said face sheets in spaced relationship with each other to define a core-receiving cavity; inserting said core in said cavity with the opposed portions of said core directly engaging the corresponding inner surfaces of said face sheets; impressing a bonding electrical potential on the surfaces of said opposed portions of said core to adhere said opposed portions of said core to said respective inner surfaces of said face sheets to maintain said face sheets and said core in a predetermined semistructural relationship with one another, the resulting electrical bond between the adjacent portions of the components of said panel being sufficient to permit the maintenance of said semistructural relationship during subsequent handling of said bonded panel but insufficient to permit the panel to resist the application of substantial structural loads and/or fatigue-inducing environment without consequent mechanical destruction; and subsequently heat bonding said electrically bonded panel to cause homogenization and unification of the material of the adjacent surfaces of said components so as to provide a structural grade panel.

7. The method of claim 6 in which said electrical bonding step is accomplished while said components of said panel are maintained in intimate engagement with one another by pressure being applied thereto.

8. The method of claim 6 in which said electrical bonding step is accomplished by the translation of electrical bonding means over the corresponding surfaces defined by the opposite portions of said core.

9. The method of claim 6 in which electrical bonding devices simultaneously apply bonding current and pressure to the juxtaposed surfaces of said core and said face sheets.

10. In a method of fabricating a metallic panel, the steps of: disposing a pair of face sheets in spaced relationship with each other to define a core-receiving cavity; disposing a core in said cavity, said core having oppositely oriented linear surfaces disposable in substantial parallelism with the respective inner surfaces of said face sheets and directly engaged with said inner surfaces; electrically bonding said linear surfaces of said core and said inner surfaces of face sheets in operative relationship with one another to create a bond sufficient to maintain said face sheets and core in a predetermined semistructural relationship; and heat bonding said respective surfaces of said core and face sheets to one another to cause homogenization of said surfaces and a resultant fully structural relationship between said face sheets and core.

11. The method of claim 9 which involves a cleaning step prior to the assembly of said face sheets and said core whereby said face sheets and said core are thoroughly cleansed.

12. The method of claim 9 in which said face sheets are subjected to pressure during the electrical bonding step to ensure intimate contact of said face sheets with said core in the bonding area.

13. The method of claim 9 in which said face sheets and said core are electrically bonded to one another by the translation of electrical bonding means in correspondence to the relevant surfaces of said face sheets and core being bonded.

14. The method of claim 9 in which said electrical bonding means simultaneously applies pressure and impresses a bonding current on said relevant surfaces of said face sheets and said core.

15. In a method of manufacturing a structural panel, the steps of: disposing a pair of face sheets in spaced relationship with each other to define a core-receiving cavity; successively depositing a plurality of core elements in said cavity, said elements having oppositely oriented surfaces disposed in direct contact and substantial parallelism with the inner surfaces of said face sheets and being shaped to provide oppositely oriented nodes thereupon with said nodes being interengaged at said oppositely oriented surfaces; electrically bonding said oppositely oriented surfaces of said core elements to the corresponding inner surfaces of said face sheets and to one another at said nodes to simultaneously form a core assembly and secure said core assembly to said face sheets, said electrical bond being sufficient to maintain said face sheets and core assembly in operative relation but insufficient to provide a fully structural degree of securement of said face sheets and core assembly; and heat bonding said core assembly and said face sheets to one another to provide a fully structural degree of securement therebetween.

16. The method of claim 17 in which the interengaged oppositely oriented surfaces of said nodes are subjected to bonding current of greater density than portions of said surfaces intermediate said nodes.

17. The method of claim 13 in which said electrical bonding step involves the application of bonding current to at least the external surface of one of said face sheets in correspondence with an oppositely oriented surface of a core element and wherein said bonding current is applied simultaneously to spaced areas of said sheet overlying, respectively, the interengaged oppositely oriented surfaces of juxtaposed core elements and an area of one of said core elements intermediate adjacent nodes.

18. In a method of bonding the electrically conductive face sheet of a composite panel to the electrically conductive core thereof where said core incorporates oppositely oriented portions having surfaces thereupon of sufficient width to engage significant areas of the inner surface of said face sheet, the steps of: disposing said face sheet on one side of said core in direct contact therewith; impressing an electrical bonding potential and pressure to the outer surface of said face sheet and to the inner surface of the oppositely oriented core portion juxtaposed to the inner surface of said face sheet to adhere said core to said face sheet in a predetermined semistructural relationship of sufficient strength to prevent damage to the members so joined in subsequent handling but of insufficient strength to accept significant loads without damage; and subsequently heat bonding said composite panel to cause homogenization and unification of the electrically bonded juxtaposed surfaces of said core and said face sheet so as to provide a composite panel of full structural grade.